Patented Aug. 25, 1925.

1,551,175

UNITED STATES PATENT OFFICE.

MAXIMILIAN A. SCHNELLER, OF NEW YORK, N. Y., ASSIGNOR TO NULOMOLINE COMPANY, A CORPORATION OF NEW YORK.

GRAINED CONFECTION AND PROCESS OF MAKING SAME.

No Drawing.   Application filed September 24, 1924.   Serial No. 739,535.

*To all whom it may concern:*

Be it known that I, MAXIMILIAN A. SCHNELLER, a citizen of the United States, and resident of New York city, county of Richmond, and State of New York, have invented certain new and useful Improvements in Grained Confections and Processes of Making Same, of which the following is a specification.

In general confections may be divided into three classes: First, hard candies consisting of amorphous sugar or mixture of sugars practically free from moisture. Second, soft ungrained confections consisting of syrups containing substantially no sugar in crystalline form and solidified with materials of a gelatinous nature. Examples of this class, are gum drops, jellies, jujubes, ungrained marshmallows, nougats and caramels. Third, candies containing fine sugar crystals surrounded by saturated or supersaturated solution of sugar constituting a liquid or syrup phase which may also contain gelatinous materials, as listed in the preceding class. This class of confections is known as grained confections and is exemplified by confections known as fondant, fudge, grained caramels, grained marshmallows, etc.

My invention relates to the third class of soft grained candies. According to customary methods of manufacture the solid sugar phase of grained confections consists principally of sucrose, the structure of which is modified by additions of other sugars, such as corn syrup, invert sugar, etc., principally in the liquid phase.

I have discovered that grained confections can be improved in a variety of ways, but particularly as to softness, fondant qualities and the capacity for maintaining freshness, by the use of certain other sugars and in such proportions as will be evident hereinafter.

When the solid sugar phase of confections consists chiefly of sucrose, as is customary, it will be found that, due to the shape and compactness of the sucrose crystals, the supporting structure formed by them has a comparatively low absorptive capacity, so that only a comparatively small amount of liquid phase may be present without the candies being moist to the touch. Furthermore, due to the comparatively high solubility of sucrose, the capacity of the liquid phase for dissolving other sugars which it might be desirable to add, is restricted.

I have now discovered that, by causing the solid phase to consist of a sugar yielding softer crystals and of less solubility than sucrose, such as dextrose hydrate or lactose, for example, there may be produced a solid supporting crystal structure having a much greater absorptive capacity, as well as a liquid phase permitting of a greater variation in the sugar content.

Several important advantages result from so constituting the solid phase of the confection, of which the following are some: (1) The softer crystals of such a sugar produces greater smoothness than the harder and more compact sucrose crystals. (2) The increased absorptive capacity of the solid phase permits a larger amount of the liquid phase without the candy being wet to the touch. This results in greater softness, better fondant qualities and increased keeping qualities. (3) In consequence of the lower solubility of the sugar constituting the solid phase, the sugar dissolving capacity of the liquid phase is correspondingly increased, permitting the use of a greater percentage of other sugars in the syrup phase, such as sucrose, corn syrup, maltose or levulose, any or all of which may be dissolved therein to the saturation point. In this way, the inherent qualities of the confections may be widely varied. For example, by the use of levulose in sufficient quantities, the desired amount of hygroscopicity may be imparted to the confection.

I prefer to use dextrose hydrate to constitute the solid phase, as this sugar crystallizes in extremely small, mushy needles of high absorptive capacity. However, other sugars of comparatively low solubility, such as lactose, may be used either alone or in combination with each other, or with dextrose, to constitute the solid phase. A further advantage of the use of dextrose resides in the fact that it is ordinarily available as the hydrate containing one molecule of water, whereby it may be compounded with the addition of little or no added water, its greatly increased solubility at higher temperatures causing it to melt in this water of crystallization at comparatively low temperatures. (In sucrose confections, an excess of water must be used in the compounding which must be gotten rid of by boiling.) In other words, when dextrose is used in the necessary quantities, so-called "cold process" candies may be made by melting together the ingredients without boiling—at say, below 200° F.

My invention may be best understood by reference to the following examples, which are illustrative thereof:

I. For the production of a so-called grained nougat, 2½ parts gelatine are dissolved in 5 parts of warm water, to which are added 60 parts invert sugar (containing 20% water) and 35 parts dextrose hydrate. The mixture is heated to preferably not over 170° F. and then beaten in a nougat heater. After cooling below 120° F. the batch is seeded with a small amount of invert sugar to insure graining over night. The final confection contains in its syrup phase approximately 17 parts water, which at room temperature holds in solution about an equal amount (17 parts) dextrose, leaving 42 parts dextrose hydrate (approximately 24 parts of which were added with the invert sugar) in the solid phase. The levulose, being the most soluble of the common sugars, remains entirely in the liquid phase.

It will be noted that in the above example a grained soft candy is produced containing no sucrose at all. It will keep fresh without chocolate coating indefinitely due to the high absorptive capacity of the supporting structure of dextrose crystals and to the presence of the hygroscopic levulose.

II. For the production of a fondant, 25 parts powdered sucrose is mixed with 30 parts invert sugar of the same composition as above and 40 parts dextrose hydrate and 10 parts water and melted at about 170° F. After cooling below 120° F., the mixture is seeded with finely-grained invert sugar or dextrose. After forty-eight hours or longer, when crystallization is complete, the mixture is beaten in a mixer to break down the interlocked crystals. The resulting fondant may be melted with a freshly prepared portion or "bob" of identical or similar composition, flavoring and coloring materials added and the fondant cast in suitable molds. The final confection will contain in its syrup phase approximately 16 parts water, sufficient to dissolve the entire amount of sucrose and levulose (present in the invert sugar).

III. For making grained caramels, 25 parts of invert sugar and 40 parts dextrose hydrate are melted together, 10 parts powdered skimmed milk are then added and the mixture beaten to a smooth paste. Three parts of gelatine previously dissolved in 9 parts of water, are added and the beating continued until the desired degree of lightness is obtained. An emulsion formed of 20 parts of butter or coco nut oil in 20 parts maltose or invert sugar syrup are now mixed in, flavoring material added and the mixture poured into trays or starch molds. In this example, the final quantity of water is approximately 18 parts, sufficient to dissolve the 26 parts of maltose or levulose added in the invert sugar, leaving an excess of dextrose hydrate to form the solid phase.

IV. For making chocolate fudge, the following ingredients in approximately the following proportions are taken:

20 parts powdered sucrose,
30 parts invert sugar, containing 20% moisture,
40 parts dextrose hydrate,
10 parts water.

The materials are melted together below the boiling point, 20 parts cocoa added and mixed in the beating machine. After cooling, the mass is seeded in crystallized dextrose or invert sugar and poured into trays. The final product contains in this case about 16% of moisture dissolved in its syrup phase, which is sufficient to hold in solution the sucrose and levulose present.

As a further example of a fondant, 30 parts lactose are boiled in a candy kettle with enough water to effect solution and cooked to a boiling point of 230° F. 25 parts of powdered sugar and 30 parts invert sugar of the same concentration as above are then added and melted at 170° F. After cooling to about 100° F. the mixture is seeded with fine lactose crystals or conveniently a portion of a previously prepared grained batch of the same or similar composition. After 48 hours or longer, when crystallization is complete, the mixture is beaten in a mixer to break down the interlocked crystals. The resulting fondant may be melted with a freshly prepared portion of an identical or similar composition and finished as in Example II.

In general my improved confections are characterized by extreme softness of grain, relatively dry appearance and high keeping qualities. In addition to the other reasons given I prefer to use dextrose hydrate to constitute the solid phase of my improved confections, due to its easy availability, but other sugars as, for example, lactose, may be used, which on account of its lower solubility is even more suitable than dextrose, but due to its higher price is more limited in its application.

In the appended claims it will be understood that the expression "solid phase" and "liquid phase" refer to the product at room temperature.

I claim:

1. A grained confection of dry appearance and relatively high keeping qualities, the solid sugar phase of which comprises a supporting structure substantially of absorptive, mushy crystals of less solubility than sucrose, while the liquid sugar phase contains sugar in greater concentration than the saturated solution of the sugar or sugars forming the solid phase.

2. A grained confection of dry appearance and relatively high keeping qualities, the solid sugar phase of which comprises a supporting structure substantially of dextrose hydrate, while the liquid sugar phase contains sugar in greater concentration than the saturated solution of dextrose.

3. A grained confection of dry appearance and relatively high keeping qualities, the solid sugar phase of which comprises a supporting structure substantially of absorptive, mushy crystals of less solubility than sucrose, while the liquid sugar phase contains sugar in at least as great concentration as a saturated solution of sucrose.

4. That step in the method of making a grained confection which consists in melting together dextrose hydrate and other sugars of greater solubility in the presence of an amount of water not substantially greater than is to be present in the final product.

5. That step in the method of making a grained confection which consists in melting together dextrose hydrate and other sugars of greater solubility in the presence of an amount of water not substantially greater than is to be present in the final product, the proportions of said sugars being such as to render the solid phase of the final product substantially of dextrose.

6. That step in the method of making a grained confection which consists in melting together dextrose hydrate and other sugars of greater solubility in the presence of an amount of water not substantially greater than is to be present in the final product, the proportions of said sugars being such as to render the solid phase of the final product substantially of dextrose and cooling and seeding with dextrose in crystalline form.

MAXIMILIAN A. SCHNELLER.